A. S. RICHARDSON.

WAX THREAD SEWING MACHINE.

No. 10,873. Reissued Oct. 11, 1887.

WITNESSES

C. M. Loore.

Fred L. Emery

INVENTOR

Arthur S. Richardson by Crosby & Gregory Attys.

N. PETERS. Photo-Lithographer, Washington, D.C.

UNITED STATES PATENT OFFICE.

ARTHUR S. RICHARDSON, OF READING, MASSACHUSETTS.

WAX-THREAD SEWING-MACHINE.

SPECIFICATION forming part of Reissued Letters Patent No. 10,873, dated October 11, 1887.

Original No. 314,478, dated March 24, 1885. Application for reissue filed March 22, 1887. Serial No. 232,014.

*To all whom it may concern:*

Be it known that I, ARTHUR S. RICHARDSON, of Reading, county of Middlesex, and State of Massachusetts, have invented an Improvement in Wax-Thread Sewing-Machines, of which the following description, in connection with the accompanying drawings, is a specification, like letters on the drawings representing like parts.

This invention has for its object to enable a post wax-thread sewing-machine having stitch-forming mechanism of ordinary general construction to stitch the outer soles to shoe-uppers, the latter being right side out; and to this end the invention consists in the provision on a machine of this class of an attenuated or slender post adapted to enter the inside of and permit the shoe to assume all the different positions or inclinations required while the stitch-forming mechanism is stitching the edge of the sole to the upper, the upper end of the post, which supports the interior of the shoe when it is being stitched, being flattened to leave a narrow thin wall between the outer side of the post and the elongated slot therein for the play of the needle as the shoe is being fed over the post, the narrow thin wall referred to permitting the needle to enter the sole of the shoe sufficiently close to its outer edge to engage and hold the upper and sole together.

Figure 1:
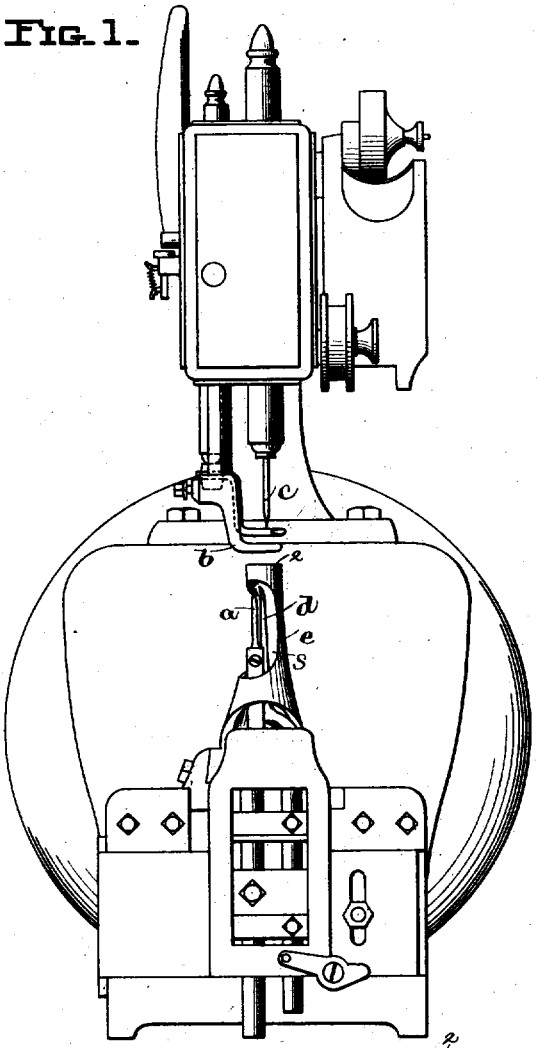
Figure 2:
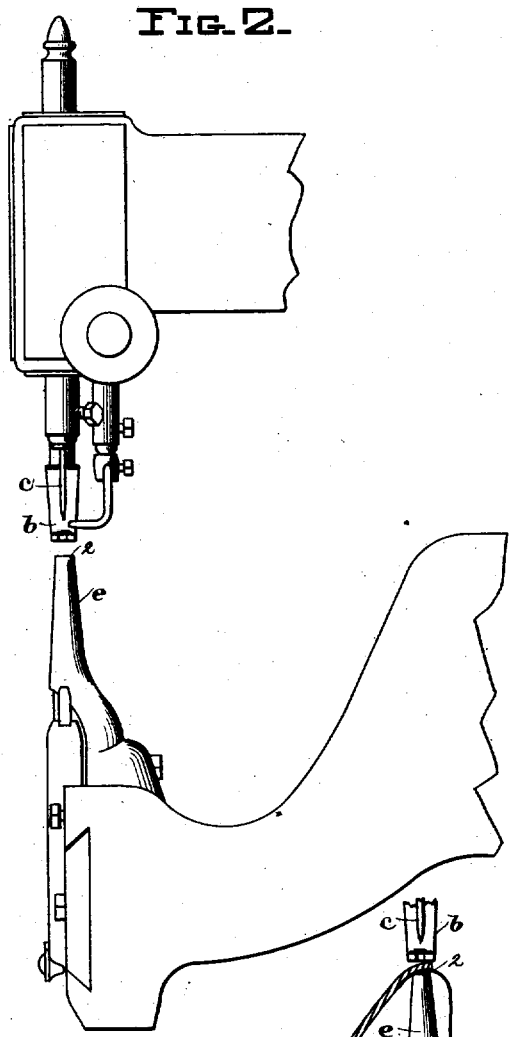
Figure 3:
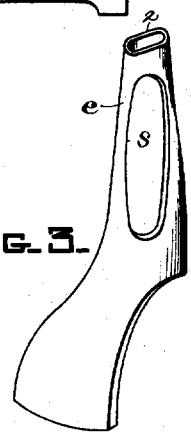
Figure 4:
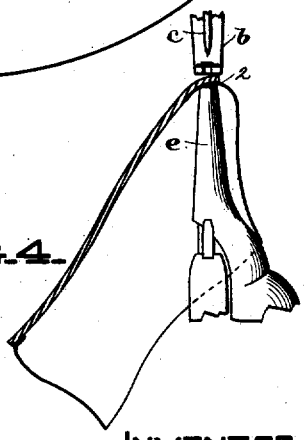

Figures 1 and 2 represent elevations of a wax-thread sewing-machine provided with my improved post. Fig. 3 represents a perspective view of the post, and Fig. 4 represents a side view of the post, showing a longitudinal section of a shoe in the position it assumes when the toe is being stitched.

The same letters of reference indicate the same parts in all the figures.

In the drawings I have shown my improvement as applied to a needle-feed machine; but it will be understood that it is equally applicable to an awl-feed machine with the awl above the end of the post.

*a* represents the vertically and laterally moving needle, *b* the presser-foot, *c* the awl, and *d* the cast-off of an ordinary side-motion wax-thread machine, these parts operating in the usual manner to form chain-stitches and effect the feeding of the shoe.

*e* represents my improved post, which is made of suitable height to support a shoe so that it can be inclined downwardly in any direction from the top of the post. The post is flattened or reduced in cross-section, so that it affords at its upper end only a narrow bearing-surface, 2, in which is formed the elongated slot *s*, as shown in Fig. 3, through which the awl or needle moves in feeding the work, the top of the post resembling a slender flattened tube, the metal surrounding the slot *s* being of only sufficient thickness to afford the necessary strength and constitute a very narrow support for the work on all sides of the slot, whereby the needle, while it will enter the slot, is brought close to the edge of the sole, so that the seam is close to said edge. The body of the post below the top is made correspondingly slender, as shown.

The described form of the post enables a shoe-upper to be placed upon it and inclined in any desired direction and to a sufficient extent to enable the post to reach any part of the inside of the shoe, including the toe, as shown in Fig. 4. I am thus enabled to stitch the sole to the upper on a line close to one edge of the sole without turning the shoe.

The class of work to which the improved machine is chiefly adapted is infants' and children's shoes.

Heretofore in stitching on the soles of this class of shoes, excepting when the Blake or McKay machine is used, the upper and sole have been turned inside out and stitched together by an ordinary sewing-machine.

My improvement obviates the labor of turning the shoe, and thus cheapens the cost of manufacture, besides obviating the wrinkling and loss of freshness caused by turning. It is obvious, however, that the improved machine may be used in the manufacture of heavier kinds of boots or shoes.

The upper and sole are lasted before the stitching operation, the outer sole being temporarily secured to the upper by the usual means, the preparation of the sole and upper being in this respect the same as when the sole is stitched by the Blake or McKay machine.

A shoe stitched by this improved machine differs from one stitched by the Blake or Mc- Kay machine, in that the chain of the stitches is formed on the inside of the sole instead of on the outside.

In an awl-feed machine the post can be made more slender than in a needle-feed machine, because no space will be required for lateral movement of the needle.

I am aware that shoes have been sewed without being turned—as, for instance, by the well-known McKay or Blake sewing-machines; but in all these cases the chain of the stitches is laid on the outer or upper surface of the sole or in a channel formed therein.

By using an ordinary wax-thread sewing-machine with my improvement attached I am enabled to sew shoes or boots on lines close to the edges of the soles without turning, and to form the chains of the stitches on the inside of the shoe, rendering it unnecessary to channel the sole for the reception of the stitches, which is difficult to do in small thin soles, and avoid the objections to bulky and unsightly chains of stitches on the surface. Moreover, the post or standard in my improvement is stationary.

I am also aware that the posts of some sewing-machines have been made comparatively slender, but am not aware that such a post has ever been combined with a wax-thread machine for sewing shoes in such a manner and so constructed that the line of stitches can be brought down close to the edge of the sole with the chain inside.

The advantages of sewing shoes with a wax-thread are well known and fully appreciated in the art, and by the use of my invention small shoes may be practically sewed with a wax-thread directly without turning the shoe—a result which has never been accomplished heretofore.

I claim—

The combination, with the needle, cast-off, and awl of a wax-thread sewing-machine, of a standard for supporting the shoe, the said standard being hollow to receive the needle and cast-off, and being also flattened near its upper end to present a narrow supporting-surface at its top between the edge of the sole and the needle and cast-off, to permit the needle to penetrate the sole close to its edge, as and for the purpose set forth.

ARTHUR S. RICHARDSON.

Witnesses:

BERNICE J. NOYES,

F. L. EMERY.